Nov. 5, 1968    R. W. BERRY, JR    3,408,722
ROTARY CUTTING TOOLS
Filed Jan. 23, 1968
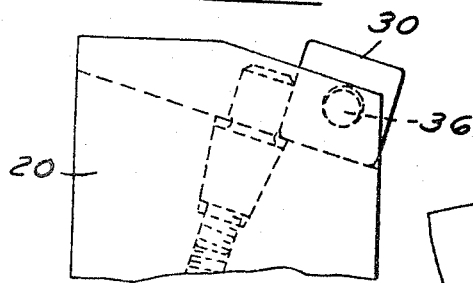
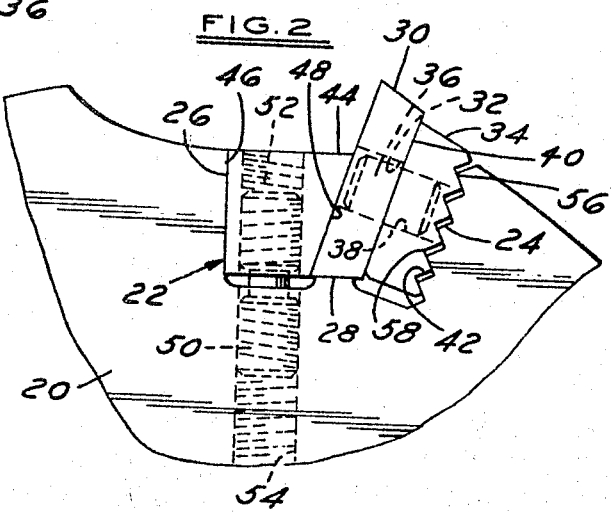
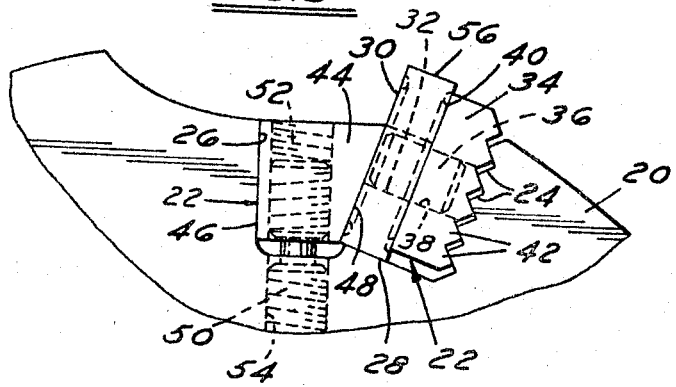
INVENTOR
ROBERT W. BERRY, JR.
BY
Barnes, Kisselle, Raisch & Choate
ATTORNEYS United States Patent Office 3,408,722
Patented Nov. 5, 1968

3,408,722
ROTARY CUTTING TOOLS
Robert W. Berry, Jr., Ferndale, Mich., assignor to Fansteel Inc., a corporation of New York
Filed Jan. 23, 1968, Ser. No. 699,841
3 Claims. (Cl. 29—105)

ABSTRACT OF THE DISCLOSURE

This invention relates to improvements in rotary cutting tools and more particularly to a rotary cutting tool with an improved means of attaching indexable throwaway carbide inserts to the main body of the cutter. The improved means of attaching the inserts to the main body utilizes a set of coacting wedges or cam surfaces and a suitably actuated wedge. This device provides a pin-type insert with a controlled wedge lock to exert a positive locking force on a cutting insert.

Background of the invention

This invention relates to improvements in rotary cutting tools and more particularly to an improved means of mounting indexable pin-type throwaway tool inserts in a main body. This invention utilizes a set of serrated teeth which can be referred to as multiple cams or wedges and a suitably actuated wedge to lock the inserts in the main body.

The general concept of a pin-type tool holder is disclosed in a variety of patents of which the Milekski Patent No. 3,176,377, Apr. 6, 1965, and Greenleaf Patent No. 3,192,603, July 6, 1965, are illustrative. The problem is to secure a throwaway indexable cutting insert in a rotary tool body in such a way that it cannot escape when subjected to extremely high centrifugal forces due to high speed rotation and it will not shift or chatter when subjected to the severe cutting forces imparted to it by contact with the work.

Description of the invention

This invention relates to improvements in rotary cutting tools and more particularly to an improved version of a rotary cutting tool utilizing throwaway tool inserts.

A principal object of this invention is to provide a means of selectively attaching a throwaway insert to the main body of the cutter so that the insert cannot be thrown out of the main body by centrifugal force.

Another object of this invention is to provide a means of adjustably mounting a throwaway insert in the main body of a rotary tool cutter such that it is securely fastened and yet able to be adjusted axially with standard back-up means and to absorb shocks by reason of a mounting which has a slight inherent give or resilience.

Another object of this invention is to provide a rotary cutting tool in which the clamping means is a relatively simple device designed for ease of manufacture and assembly.

Other objects and features of this invention will be apparent from the following description and claims in which there is found the manner of making and using the invention and the best mode contemplated by the inventor for carrying out the invention.

Drawings accompany this disclosure and the various views thereof may be briefly described as:

FIGURE 1, a partial end view of a rotary tool cutter main body with a throwaway insert installed.

FIGURE 2, a partial side view of a rotary tool cutter main body with a throwaway insert with a positive rake angle installed.

FIGURE 3, a partial side view of a rotary tool cutter main body with a throwaway insert with a negative rake angle installed.

Referring to the drawings:

FIGURES 1, 2 and 3 depict various views of a portion of a rotary tool main body 20 which contains a plurality of recesses (designated generally as 22) spaced about the periphery of the main body 20. Each recess 22 contains a first approximately radially depending wall containing a plurality of parallel, straight cam surface formations 24, a second approximately radial bearing surface area 26 and an abutment surface area 28.

In each recess 22 a throwaway tool insert 30 with a centrally located opening 32 is attached to an insert seat 34 by a pin 36 or other annular protrusion. The pin 36 is pressed into an annular opening 38, the axis of which is substantially perpendicular to a seat surface 40 of the insert seat 34. The insert seat 34 has its back surface provided with a plurality of parallel, straight cam surface formations 42 positioned to coact with the surfaces of the formations 24 in the main body 20. These formations 24 and 42 are not simply serrations designed to create an interlock. They are actually a plurality of cam or wedge surfaces to obtain a resultant downward thrust. A single wedge surface would accomplish this but it would have to go too deep into the body. Thus a plurality of surfaces are provided to accomplish the result in what might be termed a Fresnel effect.

A wedge 44 with a first surface area 46 and a second surface area 48 inclined relative to the first surface area is interposed between the bearing surface area 26 of the recess 22 and the tool insert 30. A differential pitch screw 50 threadingly engages an opening 52 in the wedge 44 and an opening 54 in the main body 20. When the differential pitch screw 50 is rotated so that the wedge 44 traverses radially inward across the bearing surface area 26, the tool insert 30 is forced into engagement with the abutment surface 28 and the formations 42 of its associated insert seat 34 are forced into engagement with the coacting formations 24 of the main body 20 to create a downward thrust. This securely attaches the throwaway tool insert 30 to the rotary tool cutter main body 20. It has been found that the friction contact at surface 48 between the wedge 44 and the leading surface of the insert 30 is insufficient to insure that the insert will be pulled down into solid contact with surface 28. However, the multiple cam seat 34, through the pin 36, creates a positive force which moves the insert firmly into contact with the abutment surface 28.

The coacting formations 24, 42 should be so calibrated that their knife edges 56, 58 do not contact each other when the tool insert 30 is clamped in the main body 20. If the knife edges 56, 58 do contact each other, the insert seat 34 will tend to pivot on the knife edges, thereby impairing the effectiveness of the clamping means and causing an adverse rate of wear of the serrated teeth 24, 42. The serrated teeth clamping means may provide a slightly resilient mounting for the tool insert 30 so that a "cushioning effect" is provided for any abnormal shock loads to which the cutting tool may be subjected. The effectiveness of this "cushioning effect" would also be impaired if the knife edges 56, 58 contact each other.

The structure shown in FIGURE 3 is basically the same as that shown in FIGURE 2, except that the tool insert 30 has a negative rake angle 56 rather than the positive rake angle 58 as shown on tool insert 30 in FIGURE 2. The use of a tool insert 30 with a negative rake angle 56 requires a change in the angular relationship of the abutment surface 28 to the seat surface 40, so that the abutment surface 28 will be properly positioned to coact with an edge surface of the tool insert 30. Minor alterations in the relationship of the various surface areas of the recess 22 to each other in order to accommodate a variety of throwaway tool inserts 30 are considered to be obvious to one skilled in the tool design art.

The particular design of the recess 22 which is shown in this disclosure is of such a configuration that it can be machined in a single pass. The overall design of this rotary tool cutter is such that both the original manufacturing cost and the maintenance or service expense should be substantially less than that of most prior art devices. The simplified and speedily actuated clamping means was developed in an effort to reduce the labor cost involved in changing the carbide inserts.

To change a carbide tool insert the differential pitch screw is rotated and the wedge is moved radially outward so that the tool insert 30 and insert seat 34 can be easily removed. The insert can then be indexed or replaced and reinserted. The differential pitch screw is then rotated so that the wedge moves radially inward, and the pressure from the wedge causes the formations 42 of the insert to move into camming engagement with the cam or wedge formations 24 of the main body. This moves the insert into contact with abutment surface 28 and locks it firmly in place for a cutting operation.

What is claimed as new is as follows:
1. A rotary cutting device comprising:
    (a) a main body containing a plurality of peripherally spaced recesses with an abutment surface and with at least one approximately radially depending wall containing a plurality of cam surfaces,
    (b) a plurality of indexable inserts each containing multiple cutting surfaces,
    (c) a plurality of insert seats each containing a plurality of cam surfaces positioned to coact with the cam surfaces of the main body,
    (d) a means of selectively attaching each insert to an insert seat, and
    (e) a means of forcing the cam surfaces of each insert seat into engagement with coacting cam surfaces in the main body and also of forcing an edge surface of the insert into contact with the abutment surface, whereby each insert and its corresponding seat is positively clamped to the main body.
2. A device as defined in claim 1 in which the means of attaching the insert to the seat comprises:
    (a) a seat having a protrusion that is substantially perpendicular to its seating surface,
    (b) an insert containing an opening, whereby the insert will slidably engage the protrusion and abut on the seating surface of the seat.
3. A device as defined in claim 1 in which the means of forcing the insert into contact with the abutment surface and the cam surfaces of its seat into contact with the cam surfaces of the main body comprises:
    (a) a main body containing a recess with a bearing surface area,
    (b) a wedge containing a first surface area positioned to coact with the bearing surface area and a second surface area inclined with respect to the first surface area and positioned to bear on the insert, and
    (c) an actuator means which positions the wedge so that its first surface area slidably engages the bearing surface area and traverses the wedge across the bearing area,
whereby an insert and its associated seat can be selectively clamped to the main body.

References Cited

UNITED STATES PATENTS

| | | | |
|---|---|---|---|
| 3,176,377 | 4/1965 | Milewski | 29—96 |
| 3,192,602 | 7/1965 | Copeland | 29—96 |
| 3,192,603 | 7/1965 | Greenleaf | 29—96 |
| 3,309,758 | 3/1967 | Williams | 29—105 |

HARRISON L. HINSON, *Primary Examiner.*